(12) United States Patent
Liu

(10) Patent No.: US 7,929,025 B2
(45) Date of Patent: Apr. 19, 2011

(54) AUTOMATIC WHITE BALANCE CONTROL SYSTEM, AUTOMATIC WHITE BALANCE MODULE, AND METHOD THEREOF

(75) Inventor: Yung-Hsin Liu, Taipei County (TW)

(73) Assignee: Mitac International Corp., Taoyuan (TW)

( * ) Notice: Subject to any disclaimer, the term of this patent is extended or adjusted under 35 U.S.C. 154(b) by 384 days.

(21) Appl. No.: 12/216,595

(22) Filed: Jul. 8, 2008

(65) Prior Publication Data

US 2009/0009624 A1 Jan. 8, 2009

(30) Foreign Application Priority Data

Aug. 7, 2007 (TW) ............................... 96129105 A

(51) Int. Cl.
*H04N 9/73* (2006.01)
*H04N 5/235* (2006.01)
(52) U.S. Cl. .................. 348/223.1; 348/229.1
(58) Field of Classification Search ............... 348/223.1, 348/229.1
See application file for complete search history.

(56) References Cited

U.S. PATENT DOCUMENTS

| 7,304,668 | B2* | 12/2007 | Ichikawa et al. | 348/223.1 |
| 7,643,068 | B2* | 1/2010 | Hyodo | 348/223.1 |
| 7,791,649 | B2* | 9/2010 | Kim et al. | 348/223.1 |
| 2004/0085458 | A1* | 5/2004 | Yanof et al. | 348/223.1 |
| 2004/0212691 | A1* | 10/2004 | Sato | 348/223.1 |
| 2006/0262197 | A1* | 11/2006 | Uezono | 348/223.1 |

* cited by examiner

*Primary Examiner* — Kelly L Jerabek
(74) *Attorney, Agent, or Firm* — Bacon & Thomas, PLLC

(57) ABSTRACT

The present invention discloses an automatic white balance control system, an automatic white balance module, and a method thereof. The automatic white balance (AWB) control system calculates a distance value from a coordinate related to the image to a reference point in a color space coordinate system for each image. If the median or mean of the distance values is greater than a threshold value, an automatic white balance operation will be performed. The system dynamically adjusts the threshold value to prevent a blinking caused by the automatic white balance. The white balance module selects an image block of a higher image sharpness to perform a gain adjustment to prevent a monochromatic block from misjudging a white balance gain.

21 Claims, 6 Drawing Sheets

AUTOMATIC WHITE BALANCE CONTROL SYSTEM, AUTOMATIC WHITE BALANCE MODULE, AND METHOD THEREOF

BACKGROUND OF THE INVENTION

1. Field of the Invention

The present invention relates to an automatic white balance control system, an automatic white balance module, and a method thereof, and more particularly to an automatic white balance control system, an automatic white balance module, and a method thereof, capable of sampling an image by dynamically adjusting threshold value and the image sharpness.

2. Description of the Related Art

At present, a digital camera generally comes with an automatic white balance function, since the color of an object varies depending on the color of a projected light, and thus the color temperature of a picture taken at a different place differs accordingly. For example, a picture taken in an illumination environment of a tungsten light bulb may appear to be slightly yellow. The automatic white balance function is provided for correcting an error caused by external lights and adjusting the intensity of three primary colors (R, G, B) in an image according to the pixel properties of the image.

Most conventional processing methods adopt a grey-world model for the white balance computation. An image gain is adjusted according to the pixel data of an image to make the mean of R/mean of G (the quotient of the mean value of primary color R intensities over the mean value of primary color G intensities) approximately equal to the mean of B/mean of G (the quotient of the mean value of primary color B intensities over the mean value of primary color G intensities) in an image. However, if the intensity of an external light source is weak, or the image includes a large number of monochromatic blocks, any noise and slight change of brightness may result in alternate enabling and disabling of the automatic white balance functions, and a decrease in stability of the brightness of the image.

In view of the foregoing drawbacks of the prior art, the inventor of the present invention based on years of experience in the related industry to conduct extensive researches and experiments, and finally developed an automatic white balance control system, an automatic white balance module, and a method thereof in accordance with the present invention to overcome the drawbacks of the prior art.

SUMMARY OF THE INVENTION

In view of the drawbacks of the prior art, the present invention provides an automatic white balance control system, an automatic white balance module, and a method thereof to improve the stability of the automatic white balance (AWB) system and prevent it from being affected by monochromatic image blocks.

It is an objective of the present invention to provide an automatic white balance (AWB) control system, comprising an image capturing module, a storage module, an image parameter calculating module, a white balance module and a control module. The image capturing module is operable to capture a plurality of images, and the storage module stores at least one threshold value. The image parameter calculating module is operable to calculate a distance value from a coordinate related to the image to a reference point in a color space coordinate system for each image, and obtain a determining parameter from the distance values. The control module compares the determining parameter and the threshold value, and if the determining parameter is greater than a threshold value, the control module drives the white balance module to execute an automatic white balance operation, and the control module counts the occurrence frequency for which the determining parameter is smaller than the threshold value, and adjusts the threshold value accordingly based on the occurrence frequency.

The present invention further provides an automatic white balance control method, comprising the step of: capturing a plurality of images; calculating a distance value from a coordinate related to the image to a reference point in a color space coordinate system for each image; obtaining a determining parameter from the distance values; providing at least one threshold value; performing an automatic white balance operation, if the determining parameter is greater than the threshold value; and counting the occurrence frequency of the determining parameter which is smaller than the threshold value, and adjusting the threshold value based on the occurrence frequency.

The present invention further provides a white balance module, comprising an image dividing unit, a sharpness calculating unit, a selecting unit, a cumulative average unit and a gain determining unit. The image dividing unit receives an image and divides the image into a plurality of image blocks, and then the sharpness calculating unit calculates the sharpness of each image block, and the selecting unit selects an image block having a sharpness value greater than a threshold value from the image blocks. The cumulative average unit calculates an R mean, an G mean and an B mean of pixels in the selected image block of the image, and the gain determining unit determines a gain adjustment based on the R mean, G mean and B mean.

The present invention further provides a white balance method, comprising the steps of: receiving an image; dividing the image into a plurality of image blocks; calculating the sharpness of each image block; selecting the image block having a sharpness value greater than a threshold value from the image blocks; calculating an R mean, an G mean and an B mean of pixels in the selected image block of the image; and determining a gain adjustment according to the R mean, the G mean and the B mean.

To make it easier for our examiner to understand the technical characteristics and effects of the present invention, we use preferred embodiments accompanied with related drawings for the detailed description of the present invention.

BRIEF DESCRIPTION OF THE DRAWINGS

The subject matter regarded as the invention is particularly pointed out and distinctly claimed in the concluding portion of the specification. The invention, both as to system and method of operation, together with features and advantages thereof may best be understood by reference to the following detailed description with the accompanying drawings in which:

DETAILED DESCRIPTION OF THE PREFERRED EMBODIMENTS

The automatic white balance control system, the automatic white balance module, and the method thereof in accordance with the invention are described by the following preferred embodiments and related drawings.

Figure 1:
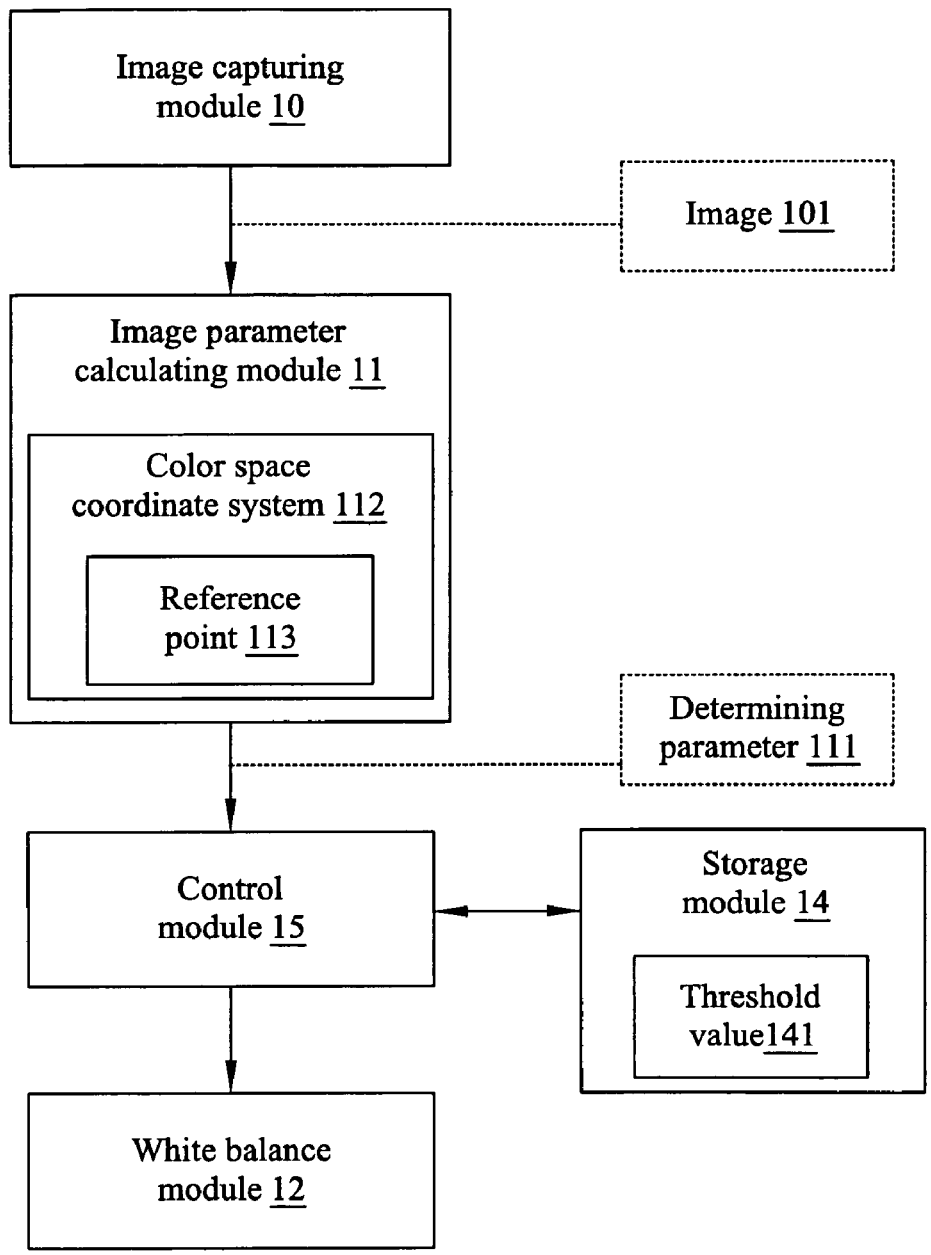
FIG. 1 is a block diagram of an automatic white balance (AWB) control system in accordance with the present invention.

FIG. 1 illustrates a block diagram of an automatic white balance (AWB) control system in accordance with the present invention. The automatic white balance (AWB) control system 1 comprises an image capturing module 10, an image parameter calculating module 11, a control module 15, a white balance module 12 and a storage module 14. The storage module 14 is provided for storing a threshold value 141, and the image capturing module 10 is provided for capturing a plurality of images 101, and the image parameter calculating module 11 is provided for calculating a distance value between each image 101 and a reference point 113 in a color space coordinate system 112. For example, a coordinates related to RGB values of all pixels of the image 101 in Cr-Cb color space coordinate system are calculated first, and then the distance value between this coordinate and the origin in the Cr-Cb color space coordinate system is calculated. Then, the image parameter calculating module 11 obtains a determining parameter 111 from the distance values of consecutive images 101, wherein the determining parameter 111 can be a median or a mean of the distance values.

The control module 15 is provided for comparing the determining parameter 111 and the threshold value 141, and if the determining parameter 111 is greater than the threshold value 141, the white balance module 12 will be driven to execute an automatic white balance operation. The control module 15 then counts the occurrence frequency in a predetermined interval for which the determining parameter 111 is smaller than a threshold value 141, and adjusting the threshold value 141 based on the occurrence frequency. For example, the storage module 14 can store a first value and a second value in advance, and the first value is greater than the second value. If the occurrence frequency counted by the control module 15 within the predetermined interval is greater than a first value, it indicates that the present threshold value 141 is too large and unable for the automatic white balance (AWB) control system 1 to effectively improve the quality of the image 101, and thus the control module 15 will adjust the threshold value 141 to a smaller value for appropriately turning on the white balance module 14 to execute an automatic white balance operation. If the occurrence frequency is smaller than a second value, it indicates that the present threshold value 141 is too small, and the control module 15 will adjust the threshold value 141 to a larger value to avoid a decrease in stability of brightness caused by the frequent switching of the automatic white balance operation.

Preferably, the aforementioned automatic white balance operation is based on a grey-world model for the white balance computation, and this operation method is a prior art and thus will not be described here. Since the automatic white balance method based on the grey-world model may be affected by the monochromatic blocks in the image and thus causing a misjudgment, and resulting in a decrease in stability of brightness to the image. Therefore, the automatic white balance (AWB) control system 1 further comprises an image sampling module for selecting at least one image block from the image 101, and the image parameter calculating module 11 can calculate the distance value of the image 101 according to the selected image blocks. To prevent the influence by the monochromatic blocks, the image sampling module can select a better image block based on the sharpness of each image block for the image parameter calculating module 11 to calculate the foregoing distance value. The image sampling module comprises an image dividing unit, a sharpness calculating unit and a selecting unit. The image dividing unit is provided for dividing the image into a plurality of blocks, and the sharpness calculating unit is provided for calculating the sharpness including an image edge value or a brightness change value of each block. Finally, the selecting unit selects a block with a higher sharpness for the image parameter calculating module to calculate the distance value, and such arrangement can effectively enhance the stability of the automatic white balance (AWB) control system 1.

Preferably, the automatic white balance (AWB) control system further can comprise an automatic exposure (AE) module for adjusting the exposure time of the image capturing module 10 based on the intensity of an external light source. Therefore, the threshold value 141 can be determined by the AE module. If the external light source is too weak, the AE module will provide a higher threshold value, and if the external light source is too strong, the AE module will provide a lower threshold value, so as to effectively enhance the performance of the automatic white balance (AWB) control system of the invention. The image parameter calculating module 11, the white balance module 12, the image sampling module and the control module 15 are preferably implemented by software means, such as using a microprocessor or a microcontroller to run related programs, or hardware means, such as using individual chip with related circuit to perform these function. The image capturing module 10 is preferably a CCD image sensor or a CMOS image sensor.

Figure 2:
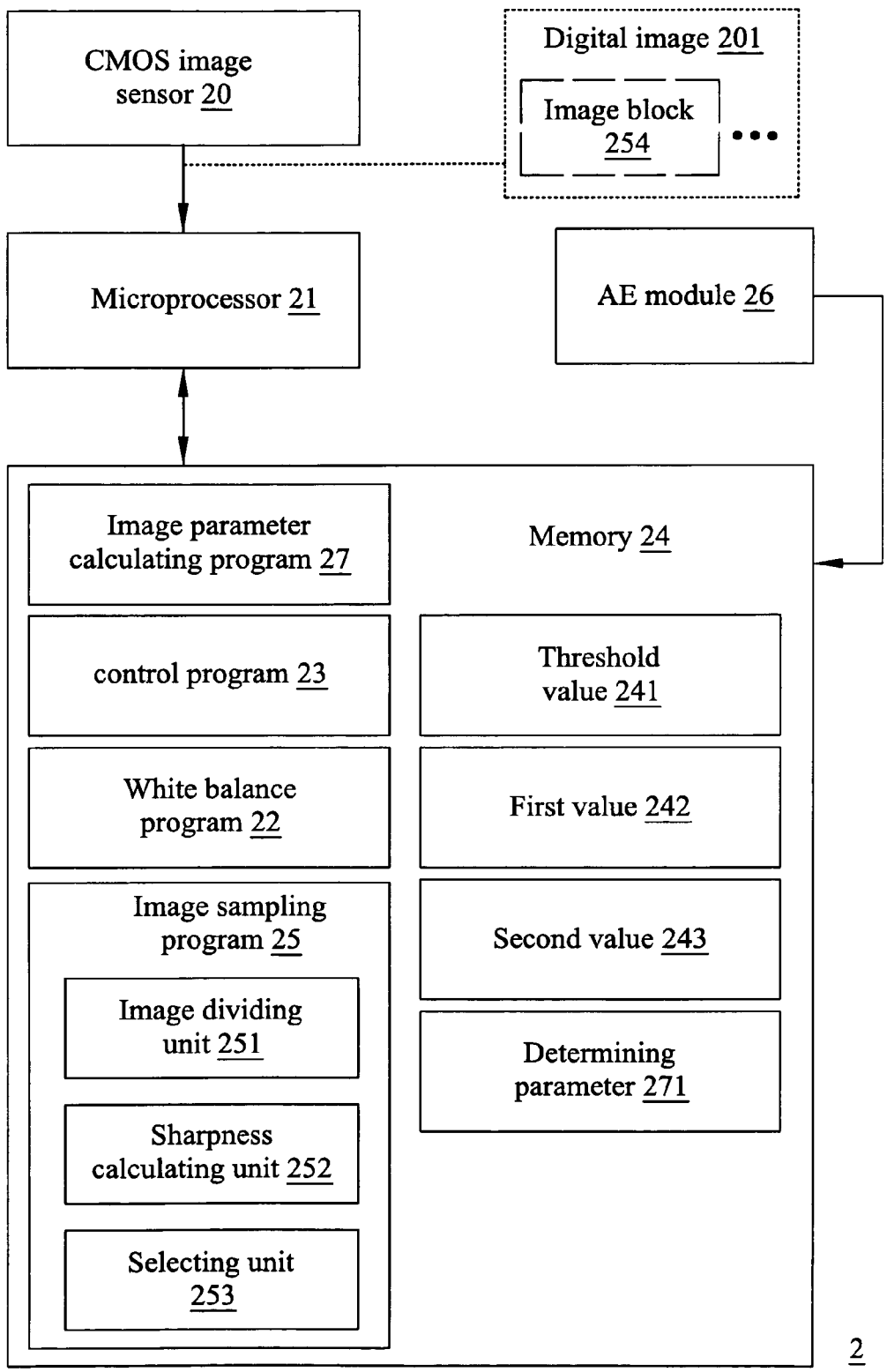
FIG. 2 is a block diagram of an automatic white balance (AWB) control system in accordance with a preferred embodiment of the present invention.

FIG. 2 illustrates a schematic view of an automatic white balance (AWB) control system in accordance with an embodiment of the present invention, the automatic white balance (AWB) control system 2 comprises a CMOS image sensor 20, a microprocessor 21, a memory 24, an image sampling program 25, an AE module 26, a white balance program 22, a control program 23 and an image parameter calculating program 27. The image parameter calculating program 27, the image sampling program 25, the white balance program 22 and the control program 23 are stored in the memory 24. The microprocessor 21 executes the white balance program 22 for a white balance operation, and the AE module 26 provides a threshold value 241. The threshold value 241, a first value 242 and a second value 243 are stored in the memory 24.

Figure 3:
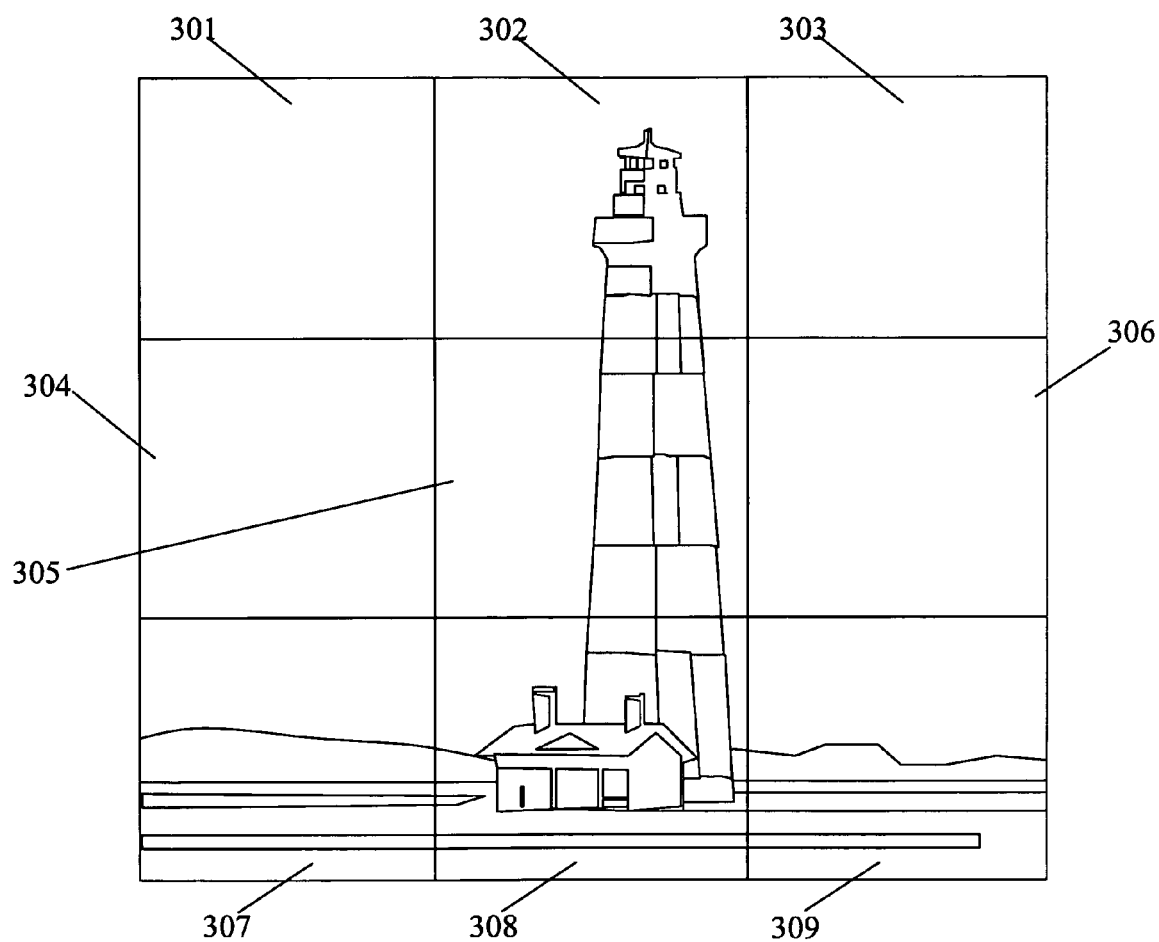
FIG. 3 is a schematic view of dividing an image in accordance with the present invention.

The CMOS image sensor 20 receives optical signals and converts the optical signals into an electric signal to produce a digital image 201. The microprocessor 21 executes the image sampling program 25 to select at least oiie appropriate image block. The image sampling program 25 comprises an image dividing unit 251, a sharpness calculating unit 252 and a selecting unit 253. The image dividing unit 251 receives a digital image 201, and divides the digital image 201 into a plurality of image blocks 254, and the sharpness calculating unit 252 calculates the sharpness of each image block 254. For example, a mask matrix can be used for calculating an edge value of the image block 254. The selecting unit 253 selects an image block having a sharpness value greater than a predetermined sharpness threshold value and outputs the selected image block to the image parameter calculating module 11. In FIG. 3, the digital image is divided into nine image blocks 301~309, and the image blocks 301, 303, 304, 306 are monochromatic blocks. If these four image blocks 301, 303, 304, 306 are used for determining whether or not to perform a white balance operation, any noise or a slight change of brightness may cause a misjudgment to execute the white balance operation or terminate the white balance process, and thus causing a decrease in stability of brightness to the image. Therefore, the selecting unit 253 can eliminate these four monochromatic image blocks according to a predetermined sharpness threshold value.

The microprocessor 21 then executes the image parameter calculating program 27, and calculates a coordinate in a Cr-Cb color space coordinate system based on the R, G, B values of a pixel of the selected image blocks, and also calculates a distance value from the calculated coordinate to the origin of the Cr-Cb color space coordinate system. The image parameter calculating program 27 uses the median of the distance values of several consecutive digital images 201 as the determining parameter 271. The microprocessor 21 executes the control program 23 to compare the determining parameter 271 with the threshold value 241. If the determining parameter 271 is greater than the threshold value 241, the microprocessor 21 will execute the white balance program 22 for performing an automatic white balance operation. In addition, the control program 23 also counts the occurrence frequency for which the determining parameter 271 is smaller than a threshold value 241 within a predetermined interval. If the counted occurrence frequency is greater than a first value 242, then the control program 23 will adjust the threshold value 241 to a larger value. If the counted occurrence frequency is smaller than a second value 243, then the control program 23 will adjust the threshold value 241 to a smaller value, so as to enhance the stability of the automatic white balance (AWB) control system 2.

Figure 4:
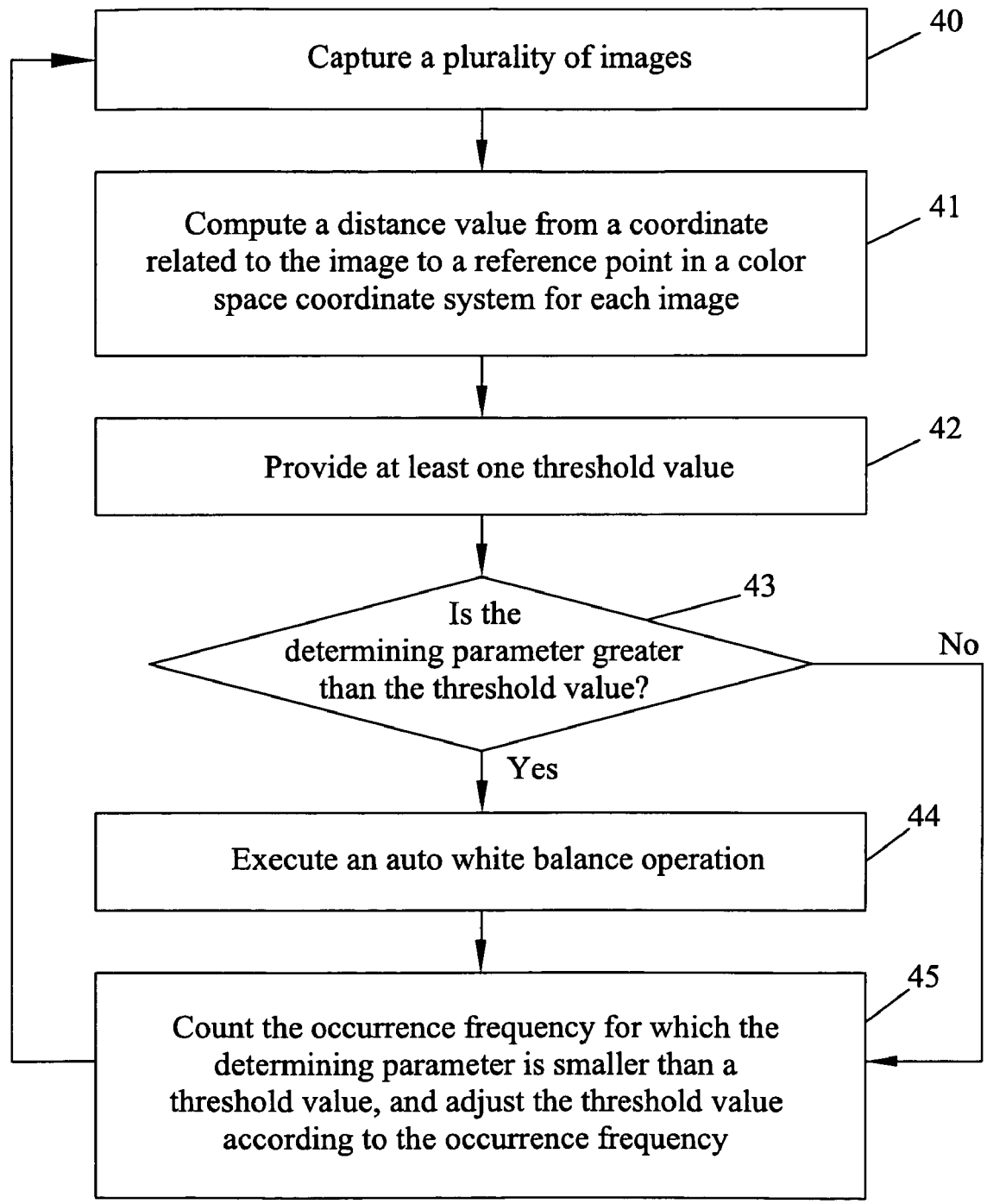
FIG. 4 is a flow chart of an automatic white balance control method in accordance with the present invention.

FIG. 4 illustrates a flow chart of an automatic white balance control method in accordance with a preferred embodiment of the present invention, the method comprises the following steps. In step 40, several consecutive images are captured by using image capturing module, such as CCD image sensor or a CMOS image sensor. In step 41, each image is transformed to a related coordinate in a color space coordinate and a distance value from the related coordinate to a reference point is calculated, and then a determining parameter is obtained from the distance values of consecutive images. Preferably, color space coordinate can be a Cr-Cb color space coordinate system, and the reference point can be an origin of the space coordinate, and the determining parameter is a median or a mean of the distance values.

In step 42, at least one threshold value is provided. Preferably, the threshold value can be provided by an automatic exposure (AE) module. In step 43 the determining parameter is determined whether or not it is greater than the threshold value. If the determining parameter is greater than the threshold value, then step 44 is executed to execute an automatic white balance operation, or else step 45 is executed. In step 45 the occurrence frequency for which the determining parameter is smaller than a threshold value is counted, and then the threshold value will be adjusted based on the occurrence frequency. For example, if the occurrence frequency is greater than a first value within a predetermined interval, then the threshold value will be adjusted to a smaller value. If the occurrence frequency is smaller than a second value within a predetermined interval, then the threshold value will be adjusted to a larger value. Finally, the Step 40 is executed again.

Preferably, the automatic white balance control method can further comprise a step of selecting at least one image block in each image between step 41 and step 42, and the distance value as described in step 42 can be calculated according to the selected image block. This method can select an appropriate image block based on the sharpness of the image blocks.

Figure 5:
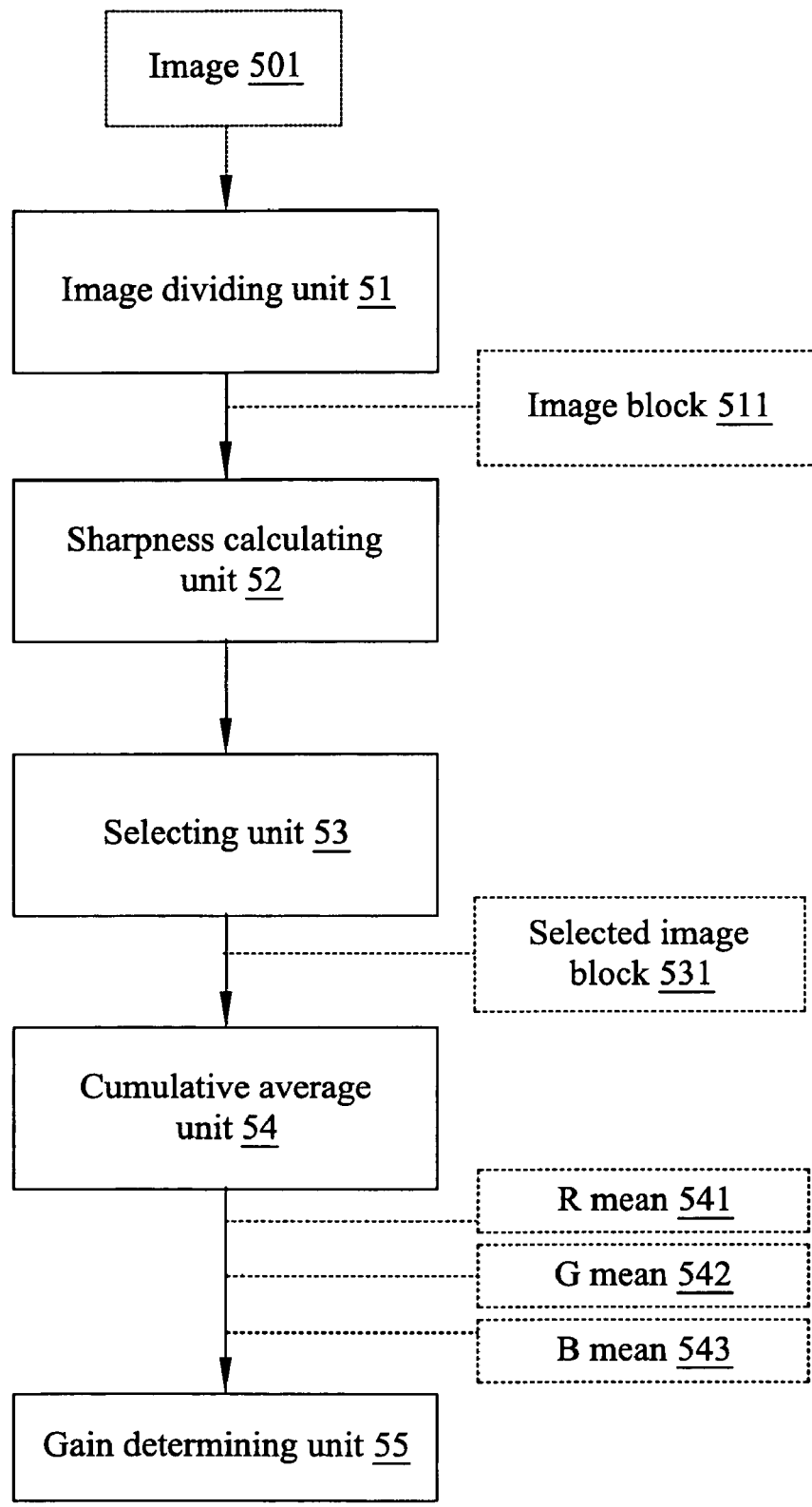
FIG. 5 is a block diagram of a white balance module in accordance with the present invention.

FIG. 5 illustrates a schematic view of a white balance module in accordance with a preferred embodiment of the present invention, the white balance module 50 comprises an image dividing unit 51, a sharpness calculating unit 52, a selecting unit 53, a cumulative average unit 54 and a gain determining unit 55. The image dividing unit 51 is provided for receiving an image 501, and dividing the image 501 into a plurality of image blocks 511. The sharpness calculating unit 52 is provided for calculating the sharpness such as an image edge value of each image block 511, and the selecting unit 53 selects an image block 531 having a sharpness value greater than the threshold value from the image blocks 511. The cumulative average unit 54 calculates an R mean 541, an G mean 542 and an B mean 543 of pixels of the selected image block 531, and the gain determining unit 55 determines a gain adjustment based on the R mean 541, G mean 542 and B mean. The gain adjustment makes the R mean 541/G mean 542 approximately equal to the B mean 543/G mean 542 in pixels of the image block 531.

If the white balance module 50 is used in an automatic white balance (AWB) control system 1 as shown in FIG. 1, and the automatic white balance (AWB) control system 1 has an image sampling module, then the image dividing unit 51, the sharpness calculating unit 52 and the selecting unit 53 can be shared with the image sampling module.

Figure 6:
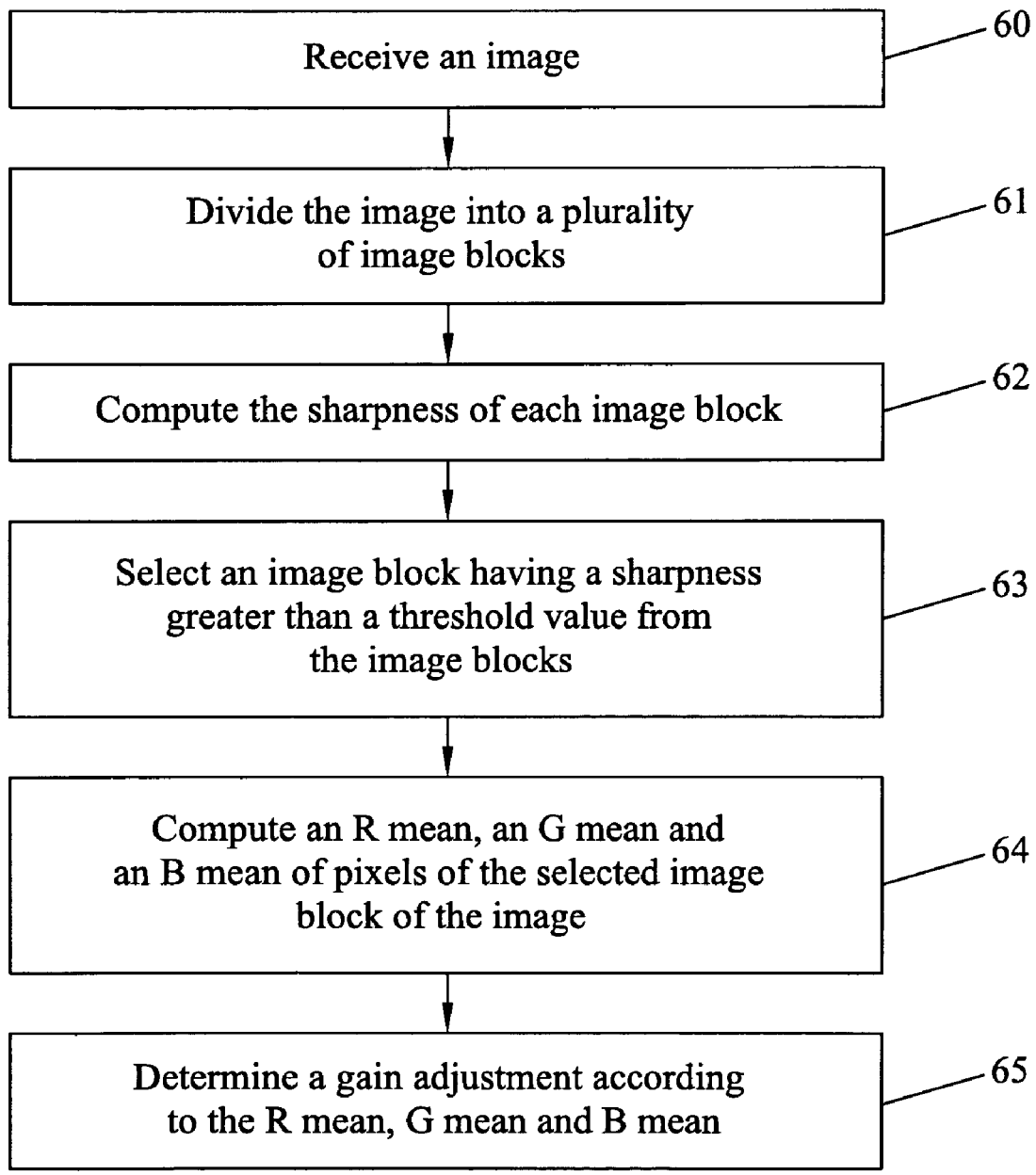
FIG. 6 is a flow chart of a white balance method in accordance with the present invention.

FIG. 6 illustrates a flow chart of a white balance method in accordance with a preferred embodiment of the present invention, and the method comprises the following steps. In step 60 an image is received. In step 61 the received image is divided into a plurality of image blocks. In step 62 the sharpness of each image block is calculate, for example, an image edge value of each image block can be used as the sharpness of each image block. In step 63, the sharpness of each image block is compared with a threshold value, and the image block having a sharpness value greater than the threshold value is selected. In step 64 an R mean, an G mean and an B mean of pixels of the selected image block of the image are calculated, and then: a gain adjustment is determined based on the R mean, G mean and B mean in step 65.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic white balance (AWB) control system comprising:
   an image capturing module for capturing a plurality of images;
   a storage module for storing at least one threshold value;
   an image parameter calculating module for calculating a distance value from a coordinate related to the image to a reference point in a color space coordinate system for each image, and obtaining a determining parameter from the distance values;
   a white balance module for executing an automatic white balance operation; and
   a control module for comparing the determining parameter and the threshold value, wherein if the determining parameter is greater than the threshold value, then the control module drives the white balance module to execute the automatic white balance operation, and the control module counts the occurrence frequency for which the determining parameter is smaller than the threshold value within a predetermined interval, and adjusting the threshold value based on the occurrence frequency;

wherein the control module adjusts the threshold value to a smaller value if the occurrence frequency is greater than a first value; and the control module adjusts the threshold value to a larger value if the occurrence frequency is smaller than a second value, and the first value is greater than the second value.

2. The automatic white balance (AWB) control system of claim 1, wherein the determining parameter is a median or a mean of the distance values.

3. The automatic white balance (AWB) control system of claim 1, further comprising an image sampling module for selecting at least one image block from each image, wherein the image parameter calculating module calculates the distance value based on the selected image blocks.

4. The automatic white balance (AWB) control system of claim 3, wherein the image sampling module divides the image into a plurality of image blocks, and selects the selected image blocks according to the sharpness of the image blocks.

5. The automatic white balance (AWB) control system of claim 1, wherein the image capturing module is a CCD image sensor or a CMOS image sensor.

6. The automatic white balance (AWB) control system of claim 1, further comprising an automatic exposure (AE) processing module for providing the threshold value.

7. The automatic white balance (AWB) control system of claim 1, wherein the reference point is an origin of the color space coordinate system.

8. The automatic white balance (AWB) control system of claim 1, wherein the color space coordinate system is a Cr-Cb color space coordinate system.

9. The automatic white balance (AWB) control system of claim 1, wherein the white balance module, comprising comprises:

an image dividing unit for receiving the image, and dividing the received image into a plurality of image blocks;
a sharpness calculating unit for calculating the sharpness of each image block;
a selecting unit for selecting an image block having a sharpness value greater than the threshold value from the image blocks;
a cumulative average unit for calculating an R mean, an G mean and an B mean of pixels of the selected image block of the image; and
a gain determining unit for determining a gain adjustment based on the R mean, the G mean and the B mean.

10. The automatic white balance (AWB) control system of claim 9, wherein the gain adjustment makes the R mean/the G mean approximately equal to the B mean/the G mean.

11. The automatic white balance (AWB) control system of claim 9, wherein the sharpness is an edge value of the image block.

12. An automatic white balance control method, including the steps of:

capturing a plurality of images;
calculating a distance value from a coordinate related to the image to a reference point in a color space coordinate system for each image;
obtaining a determining parameter from the distance values;
providing at least one threshold value;
performing an automatic white balance operation, if the determining parameter is greater than the threshold value; and
counting the occurrence frequency for which the determining parameter is smaller than the threshold value within a predetermined interval, and adjusting the threshold value based on the occurrence frequency; and
wherein the threshold value is adjusted to a smaller value if the occurrence frequency is greater than a first value, and the threshold value is adjusted to a larger value if the occurrence frequency is smaller than a second value, and the first value is greater than the second value.

13. The automatic white balance control method of claim 12, wherein the determining parameter is a median or a mean of the distance values.

14. The automatic white balance control method of claim 12, wherein the threshold value is a numeric value related to an automatic exposure (AE) parameter.

15. The automatic white balance control method of claim 12, wherein the reference point is an origin of the color space coordinate system.

16. The automatic white balance control method of claim 12, wherein the color space coordinate system is a Cr-Cb color space coordinate system.

17. The automatic white balance control method of claim 12, further including steps of selecting at least one image block from each image, and calculating the distance values based on the selected image block of each image.

18. The automatic white balance control method of claim 17, further including a step of selecting the selected image blocks based on the sharpness of the image blocks.

19. The automatic white balance control method of claim 12, wherein the step of performing an automatic white balance operation further includes the steps of:

receiving the image;
dividing the image into a plurality of image blocks;
calculating the sharpness of each image block;
selecting the image block having a sharpness value greater than the threshold value from the image blocks;
calculating an R mean, an G mean and an B mean of pixels in the selected image block of the image; and
determining a gain adjustment based on the R mean, the G mean and the B mean.

20. The automatic white balance control method of claim 19, wherein the gain adjustment makes the R mean/the G mean approximately equal to the B mean/the G mean.

21. The automatic white balance control method of claim 19, wherein the sharpness is an edge value of the image block.

* * * * *